United States Patent
Robinson

(10) Patent No.: US 12,231,433 B2
(45) Date of Patent: *Feb. 18, 2025

(54) POLICY-BASED SECURE COMMUNICATION SESSION USING DIRECT LINK AND DIGITALLY SEGREGATED SECURE TUNNELS

(71) Applicant: Netskope, Inc., Santa Clara, CA (US)

(72) Inventor: James S. Robinson, Indianapolis, IN (US)

(73) Assignee: Netskope, Inc., Santa Clara, CA (US)

( * ) Notice: Subject to any disclaimer, the term of this patent is extended or adjusted under 35 U.S.C. 154(b) by 76 days.

This patent is subject to a terminal disclaimer.

(21) Appl. No.: 18/311,054

(22) Filed: May 2, 2023

(65) Prior Publication Data

US 2023/0269254 A1 Aug. 24, 2023

Related U.S. Application Data

(63) Continuation of application No. 17/985,733, filed on Nov. 11, 2022, now Pat. No. 11,671,430, which is a
(Continued)

(51) Int. Cl.
*H04L 29/06* (2006.01)
*H04L 9/40* (2022.01)
(Continued)

(52) U.S. Cl.
CPC ........ *H04L 63/102* (2013.01); *H04L 63/0435* (2013.01); *H04L 63/20* (2013.01); *H04L 67/141* (2013.01); *H04L 67/561* (2022.05)

(58) Field of Classification Search
CPC . H04L 63/102; H04L 63/0435; H04L 63/164; H04L 63/1408; H04L 63/20; H04L 63/0478
(Continued)

(56) References Cited

U.S. PATENT DOCUMENTS

| 5,440,723 A | 8/1995 | Arnold et al. |
| 6,513,122 B1 | 1/2003 | Magdych et al. |

(Continued)

FOREIGN PATENT DOCUMENTS

| EP | 1063833 A2 | 12/2000 |
| EP | 2854347 A2 | 4/2015 |

(Continued)

OTHER PUBLICATIONS

Martin, Victoria "Cooperative Security Fabric," The Fortinet Cookbook, Jun. 8, 2016, 6 pgs., archived Jul. 28, 2016 at https://web.archive.org/web/20160728170025/http://cookbook.fortinet.com/cooperative-security-fabric-54.

(Continued)

*Primary Examiner* — Longbit Chai
(74) *Attorney, Agent, or Firm* — MUGHAL GAUDRY & FRANKLIN PC

(57) ABSTRACT

A policy-based security system for establishing a secure session from client devices to a web server includes a policy component with policies, a client device with a local application to select a cloud service, and a mid-link server. A set of policies is determined based on parameters and a tag of a shared content between the client device and the web server for the cloud service. The set of policies selectively direct traffic to the mid-link server based on the tag, and the set of policies specify a direct link between the client device and the web server if the client device satisfies security standards or a secure tunnel between the client device and the mid-link server for the secure session based on the client device does not satisfy the security standards. The secure session establishes the secure session for the cloud service and for providing the shared content.

20 Claims, 9 Drawing Sheets

Related U.S. Application Data continuation-in-part of application No. 17/549,638, filed on Dec. 13, 2021, now Pat. No. 11,882,125, which is a continuation of application No. 17/331,516, filed on May 26, 2021, now Pat. No. 11,233,801.

(51) Int. Cl.
  *H04L 67/141* (2022.01)
  *H04L 67/561* (2022.01)

(58) Field of Classification Search
  USPC .......................................................... 726/1
  See application file for complete search history.

(56) References Cited

U.S. PATENT DOCUMENTS

| | | |
|---|---|---|
| 6,622,248 B1 | 9/2003 | Hirai |
| 7,080,408 B1 | 7/2006 | Pak et al. |
| 7,298,864 B2 | 11/2007 | Jones |
| 7,376,719 B1 | 5/2008 | Shafer et al. |
| 7,735,116 B1 | 6/2010 | Gauvin |
| 7,966,654 B2 | 6/2011 | Crawford |
| 8,000,329 B2 | 8/2011 | Fendick et al. |
| 8,296,178 B2 | 10/2012 | Hudis et al. |
| 8,793,151 B2 | 7/2014 | DelZoppo et al. |
| 8,839,417 B1 | 9/2014 | Jordan |
| 9,087,189 B1 | 7/2015 | Koeten et al. |
| 9,197,601 B2 | 11/2015 | Pasdar |
| 9,225,734 B1 | 12/2015 | Hastings |
| 9,231,968 B2 | 1/2016 | Fang et al. |
| 9,280,678 B2 | 3/2016 | Redberg |
| 9,749,292 B2 | 8/2017 | Martini |
| 9,811,662 B2 | 11/2017 | Sharpe et al. |
| 10,084,825 B1 | 9/2018 | Xu |
| 10,237,282 B2 | 3/2019 | Nelson et al. |
| 10,334,442 B2 | 6/2019 | Vaughn et al. |
| 10,382,468 B2 | 8/2019 | Dods |
| 10,484,334 B1 | 11/2019 | Lee et al. |
| 10,798,558 B2 | 10/2020 | Raleigh et al. |
| 10,826,941 B2 | 11/2020 | Jain et al. |
| 11,005,682 B2 | 5/2021 | Chang et al. |
| 11,019,106 B1 | 5/2021 | Harvell |
| 11,032,301 B2 | 6/2021 | Mandrychenko et al. |
| 11,036,856 B2 | 6/2021 | Graun et al. |
| 11,134,104 B2 | 9/2021 | Qureshi et al. |
| 11,281,775 B2 | 3/2022 | Burdett et al. |
| 11,546,358 B1 | 1/2023 | Robinson et al. |
| 2002/0099666 A1 | 7/2002 | Dryer et al. |
| 2003/0055994 A1 | 3/2003 | Herrmann et al. |
| 2003/0063321 A1 | 4/2003 | Inoue et al. |
| 2003/0172292 A1 | 9/2003 | Judge |
| 2003/0204632 A1 | 10/2003 | Willebeek-Lemair et al. |
| 2004/0015719 A1 | 1/2004 | Lee et al. |
| 2005/0010593 A1 | 1/2005 | Fellenstein et al. |
| 2005/0271246 A1 | 12/2005 | Sharma et al. |
| 2006/0156401 A1 | 7/2006 | Newstadt et al. |
| 2007/0204018 A1 | 8/2007 | Chandra et al. |
| 2007/0237147 A1 | 10/2007 | Quinn et al. |
| 2008/0069480 A1 | 3/2008 | Aarabi et al. |
| 2008/0134332 A1 | 6/2008 | Keohane et al. |
| 2009/0144818 A1 | 6/2009 | Kumar et al. |
| 2009/0249470 A1 | 10/2009 | Litvin et al. |
| 2009/0300351 A1 | 12/2009 | Lei et al. |
| 2010/0017436 A1 | 1/2010 | Wolge |
| 2011/0119481 A1 | 5/2011 | Auradkar et al. |
| 2011/0145594 A1 | 6/2011 | Jho et al. |
| 2012/0278896 A1 | 11/2012 | Fang et al. |
| 2013/0005299 A1* | 1/2013 | Raleigh ................... H04L 63/04 455/406 |
| 2013/0159694 A1 | 6/2013 | Chiueh et al. |
| 2013/0298190 A1 | 11/2013 | Sikka et al. |
| 2013/0347085 A1 | 12/2013 | Hawthorn et al. |
| 2014/0013112 A1 | 1/2014 | Cidon et al. |
| 2014/0068030 A1 | 3/2014 | Chambers et al. |
| 2014/0068705 A1 | 3/2014 | Chambers et al. |
| 2014/0259093 A1 | 9/2014 | Narayanaswamy et al. |
| 2014/0282843 A1 | 9/2014 | Buruganahalli et al. |
| 2014/0359282 A1 | 12/2014 | Shikfa et al. |
| 2014/0366079 A1 | 12/2014 | Pasdar |
| 2015/0100357 A1 | 4/2015 | Seese et al. |
| 2016/0006765 A1* | 1/2016 | Shem Tov ............. H04L 63/08 726/1 |
| 2016/0323318 A1 | 11/2016 | Terrill et al. |
| 2016/0350145 A1 | 12/2016 | Botzer et al. |
| 2017/0064005 A1 | 3/2017 | Lee |
| 2017/0093917 A1 | 3/2017 | Chandra et al. |
| 2017/0250951 A1 | 8/2017 | Wang et al. |
| 2019/0173895 A1 | 6/2019 | Scales |
| 2020/0050686 A1 | 2/2020 | Kamalapuram et al. |
| 2020/0053051 A1 | 2/2020 | Medappa et al. |
| 2020/0220746 A1 | 7/2020 | Shribman et al. |
| 2021/0250333 A1 | 8/2021 | Negrea et al. |
| 2022/0366050 A1 | 11/2022 | Ben-Noon et al. |
| 2022/0385669 A1 | 12/2022 | Robinson |
| 2023/0089132 A1 | 3/2023 | Robinson |

FOREIGN PATENT DOCUMENTS

| | | |
|---|---|---|
| EP | 3690649 A1 | 8/2020 |
| JP | 2010123115 A | 6/2010 |
| JP | 2019096339 A | 6/2019 |
| WO | 0131855 A2 | 5/2001 |
| WO | 2012048210 A1 | 4/2012 |

OTHER PUBLICATIONS

Huckaby, Jeff Ending Clear Text Protocols,' Rackaid.com, Dec. 9, 2008, 3 pgs.

Nevvton, Harry "fabric," Newton's Telecom Dictionary, 30th Updated, Expanded, Anniversary Edition, 2016, 3 pgs.

Fortinet, "Fortinet Security Fabric Earns 100% Detection Scores Across Several Attack Vectors in NSS Labs' Latest Breach Detection Group Test [press release]", Aug. 2, 2016, 4 pgs, available at https://www.fortinet.com/de/corporate/about-US/newsroom/press-releases/2016/security-fabric-earns-100-percent-breach-detection-scores-nss-labs.

Fortinet, "Fortinet Security Fabric Named 2016 CRN Network Security Product of the Year [press release]", Dec. 5, 2016, 4 pgs, available at https://www.fortinet.com/corporate/about-us/newsroom/press-releases/2016/fortinet-security-fabric-named-2016-crn-network-security-product.

McCullagh, Declan, "How safe is instant messaging? A security and privacy survey," CNET, Jun. 9, 2008, 14 pgs.

Beck et al. "IBM and Cisco: Together for a World Class Data Center," IBM Redbooks, Jul. 2013, 654 pgs.

Martin, Victoria "Installing internal FortiGates and enabling a security fabric," The Fortinet Cookbook, Jun. 8, 2016, 11 pgs, archived Aug. 28, 2016 at https://web.archive.org/web/20160828235831/http://cookbook.fortinet.com/installing-isfw-fortigate-enabling-csf-54.

Zetter, Kim, "Revealed: The Internet's Biggest Security Hole," Wired, Aug. 26, 2008, 13 pgs.

Adya et al., 'Farsite: Federated, available, and reliable storage for an incompletely trusted environment, SIGOPS Oper. Syst. Rev. 36, SI, Dec. 2002, pp. 1-14.

Agrawal et al., "Order preserving encryption for numeric data," In Proceedings of the 2004 ACM SIGMOD international conference on Management of data, Jun. 2004, pp. 563-574.

Balakrishnan et al., "A layered naming architecture for the Internet," ACM SIGCOMM Computer Communication Review, 34(4), 2004, pp. 343-352.

Downing et al. , Naming Dictionary of Computer and Internet Terms, (11th Ed.) Barron's, 2013, 6 pgs.

Downing et al., Dictionary of Computer and Internet Terms, (10th Ed.) Barron's, 2009, 4 pgs.

Zoho Mail, "Email Protocols: What they are & their different types," 2006, 7 pgs. available at https://www.zoho.com/mail/glossary/email-protocols.htm#:~:text=mode of communication.-,What are the different email protocols%3F, and also has defined functions.

(56) References Cited

OTHER PUBLICATIONS

NIIT, Special Edition Using Storage Area Networks, Que, 2002, 6 pgs.

Chapple, Mike, "Firewall redundancy: Deployment scenarios and benefits," Tech Target, 2005, 5 pgs. available at https://www.techtarget.com/searchsecurity/tip/Firewall-redundancy-Deployment-scenarios-and-benefits?%20Offer=abt_pubpro_Al-Insider.

Fortinet, FortiGate—3600 User Manual (vol. 1 , Version 2.50 MR2) Sep. 5, 2003, 329 pgs.

Fortinet, FortiGate SOHO and SMB Configuration Example, (Version 3.0 MR5), Aug. 24, 2007, 54 pgs.

Fortinet, FortiSandbox—Administration Guide, (Version 2.3.2), Nov. 9, 2016, 191 pgs.

Fortinet, FortiSandbox Administration Guide, (Version 4.2.4) Jun. 12, 2023, 245 pgs. available at https://fortinetweb.s3.amazonaws.com/docs.fortinet.com/v2/attachments/fba32b46-b7c0-11ed-8e6d-fa163e15d75b/FortiSandbox-4.2.4-Administration_Guide.pdf.

Fortinet,FortiOS—Administration Guide, (Versions 6.4.0), Jun. 3, 2021, 1638 pgs.

Heady et al., "The Architecture of a Network Level Intrusion Detection System," University of New Mexico, Aug. 15, 1990, 21 pgs.

Kephart et al., "Fighting Computer Viruses," Scientific American (vol. 277, No. 5) Nov. 1997, pp. 88-93.

Wang, L., Chapter 5: Cooperative Security in D2D Communications, "Physical Layer Security in Wireless Cooperative Networks," 41 pgs. first online on Sep. 1, 2017 at https://link.springer.com/chapter/%2010.1007/978-3-319-61863-0_5.

Lee et al., "A Data Mining Framework for Building Intrusion Detection Models," Columbia University, n.d. 13 pgs.

Merriam-Webster Dictionary, 2004, 5 pgs.

Microsoft Computer Dictionary, (5th Ed.), Microsoft Press, 2002, 8 pgs.

Microsoft Computer Dictionary, (4th Ed.), Microsoft Press, 1999, 5 pgs.

Mika et al. "Metadata Statistics for a Large Web Corpus," LDOW2012, Apr. 16, 2012, 6 pgs.

Oxford Dictionary of Computing (6th Ed.), 2008, 5 pgs.

Paxson, Vern, "Bro: a System for Detecting Network Intruders in Real-Time," Proceedings of the 7th USENIX Security Symposium, Jan. 1998, 22 pgs.

Fortinet Inc., U.S. Appl. No. 62/503,252, "Building a Cooperative Security Fabric of Hierarchically Interconnected Network Security Devices." n.d., 87 pgs.

Song et al., "Practical techniques for searches on encrypted data," In Proceeding 2000 IEEE symposium on security and privacy. S&P 2000, May 2000, pp. 44-55.

Dean, Tamara, Guide to Telecommunications Technology, Course Technology, 2003, 5 pgs,.

U.S. Appl. No. 60/520,577, "Device, System, and Method for Defending a Computer Network," Nov. 17, 2003, 21 pgs.

U.S. Appl. No. 60/552,457, "Fortinet Security Update Technology," Mar. 2004, 6 pgs.

Tittel, Ed, Unified Threat Management For Dummies, John Wiley & Sons, Inc., 2012, 76 pgs.

Fortinet, FortiOS Handbook: UTM Guide (Version 2), Oct. 15, 2010, 188 pgs.

Full Definition of Security, Wayback Machine Archive of Merriam-Webster on Nov. 17, 2016, 1 pg.

Definition of Cooperative, Wayback Machine Archive of Merriam-Webster on Nov. 26, 2016, 1 pg.

Pfaffenberger, Bryan, Webster's New World Computer Dictionary, (10th Ed.), 2003, 5 pgs.

* cited by examiner

POLICY-BASED SECURE COMMUNICATION SESSION USING DIRECT LINK AND DIGITALLY SEGREGATED SECURE TUNNELS

CLAIM FOR PRIORITY

This application is a continuation of U.S. patent application Ser. No. 17/985,733, filed Nov. 11, 2022, which is a continuation-in-part of U.S. patent application Ser. No. 17/549,638, filed on Dec. 13, 2021, which is a continuation of U.S. patent application Ser. No. 17/331,516, filed May 26, 2021, now U.S. Pat. No. 11,233,801, each of which are hereby expressly incorporated by reference in their entirety for all purposes.

BACKGROUND

This disclosure relates in general to session protocol security and, but not by way of limitation, to a policy-based selection of encryption protocols or digitally segregated tunnels for a secure communication session, among other things.

Encrypted communication has been challenging for enterprises. The challenges in secrets management, encryption key negotiations, and the strength of the ciphers are some of them. Many enterprises have solutions that enforce encryption rules for ciphers and other encryption key negotiation mechanisms using group policy on managed endpoints. However, these solutions cannot be pushed to each user of a cloud service from unmanaged devices like mobile phones. Additionally, encryption protocols used in communication sessions become obsolete or depreciated over time which results in insecure communication links.

Weak communication links during a communication session between a client and a server pose threat to the integrity of content being shared. The content might be easily hacked and/or altered resulting in compromised content. The compromised content accompanies considerable financial losses to the enterprises and insecurity among the employees in the enterprise. Further, merely relying on default encryption settings and trusting the established communication links does not improve the vulnerability of the communication session.

SUMMARY

In one embodiment, the present disclosure provides a policy-based security system for establishing a secure session from client devices to a web server includes a policy component with policies, a client device with a local application to select a cloud service, and a mid-link server. A set of policies is determined based on parameters and a tag of a shared content between the client device and the web server for the cloud service. The set of policies selectively direct traffic to the mid-link server based on the tag, and the set of policies specify a direct link between the client device and the web server if the client device satisfies security standards or a secure tunnel between the client device and the mid-link server for the secure session based on the client device does not satisfy the security standards. The secure session establishes the secure session for the cloud service and for providing the shared content.

In an embodiment, a policy-based security system for establishing a direct link or a secure tunnel from client devices to remote instances on a web server. The policy-based security system includes a policy component, a data classifier, a client device, and a mid-link server. The policy component includes a plurality of policies. The plurality of policies is based on a set of parameters. The plurality of policies specifies configuration settings of a plurality of secure tunnels and a plurality of session protocols. The client device includes a local application configured to execute on the client device. The local application is further configured to select a cloud service from a plurality of cloud services for shared content. A data classifier identifies a tag associated with the shared content. The shared content is to be provided between a client device and the web server. The mid-link server is coupled to the plurality of secure tunnels. The mid-link server includes a policy enforcer and a router. The policy enforcer configured to determine a set of policies from the plurality of policies for the client device based on the set of parameters and the tag. The set of policies selectively direct traffic to the mid-link server based on the tag of the shared content, and the set of policies specify a direct link between the client device and the web server if the client device satisfies security standards or a secure tunnel between the client device and the mid-link server to establish a secure session with the web server based on the client device does not satisfy the security standards. The router establishes via an encryption link a secure session of the client device with the web server for providing the shared content using the session protocol from the set of session protocols based on the direct link, or a tunnel protocol based on the secure tunnel.

In another embodiment, a method for establishing policy-based security for a secure session between a plurality of client devices and a web server in cloud-based multi-tenant systems. In one step, a tag associated with a shared content is identified. The shared content is to be provided between a client device and the web server. A set of policies for a client device of the plurality of client devices is determined with a policy component having a plurality of policies. The set of policies from the plurality of policies are determined based on a set of parameters. The set of policies specify configuration settings of a plurality of secure tunnels and a plurality of session protocols. The set of policies are provisioned on a mid-link server between the client device and the web server. The set of policies selectively direct traffic to the mid-link server based on the tag of the content, and the set of policies specify a direct link between the client device and the web server if the client device satisfies security standards or a secure tunnel between the client device and the mid-link server to establish a secure session with the web server based on the client device does not satisfy the security standards. A selection of a cloud service from a plurality of cloud services for providing the shared content is received from a local application running on the client device of the plurality of client devices. The set of policies are provisioned on a mid-link server between the client device and the web server. An encryption link of a plurality of encryption links specified for the set of policies and the cloud service are determined. The plurality of encryption links delivers the cloud service to the client device. A set of session protocols from the plurality of session protocols for establishing a secure session between the client device and the web server in accordance with the set of policies is selected. A secure session of the client device with the web server is established via the encryption link using either the session protocol from the set of session protocols based on the direct link, or the tunnel protocol based on the secure tunnel.

In yet another embodiment, a policy-controlled communication system including client devices establishing a secure session with remote instances on a web server using an encryption protocol, the policy controlled communication system comprising a plurality of servers, collectively having code for:

identifying a tag associated with a shared content, wherein the shared content is to be provided between a client device and the web server;

provisioning on a mid-link server between the client device and the web server, the set of policies;

determining a set of policies for a client device of a plurality of client devices with a policy component having a plurality of policies, wherein: the set of policies from the plurality of policies are determined based on a set of parameters and the tag, the set of policies specify configuration settings of a plurality of secure tunnels and a plurality of session protocols, and the set of policies selectively direct traffic to the mid-link server based on the tag of the content, and the set of policies specify a direct link between the client device and the web server if the client device satisfies security standards or a secure tunnel between the client device and the mid-link server to establish a secure session with the web server based on the client device does not satisfy the security standards;

receiving from a local application running on the client device of the plurality of client devices, selection of a cloud service from a plurality of cloud services for providing the shared content;

determining an encryption link of a plurality of encryption links specified for the set of policies and the cloud service, wherein the plurality of encryption links deliver the cloud service to the client device;

selecting a set of session protocols from the plurality of session protocols for establishing the secure session between the client device and the web server in accordance with the set of policies; and establishing via the encryption link a secure session of the client device with the web server for providing the shared content using: the session protocol from the set of session protocols based on the direct link, or a tunnel protocol based on the secure tunnel.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
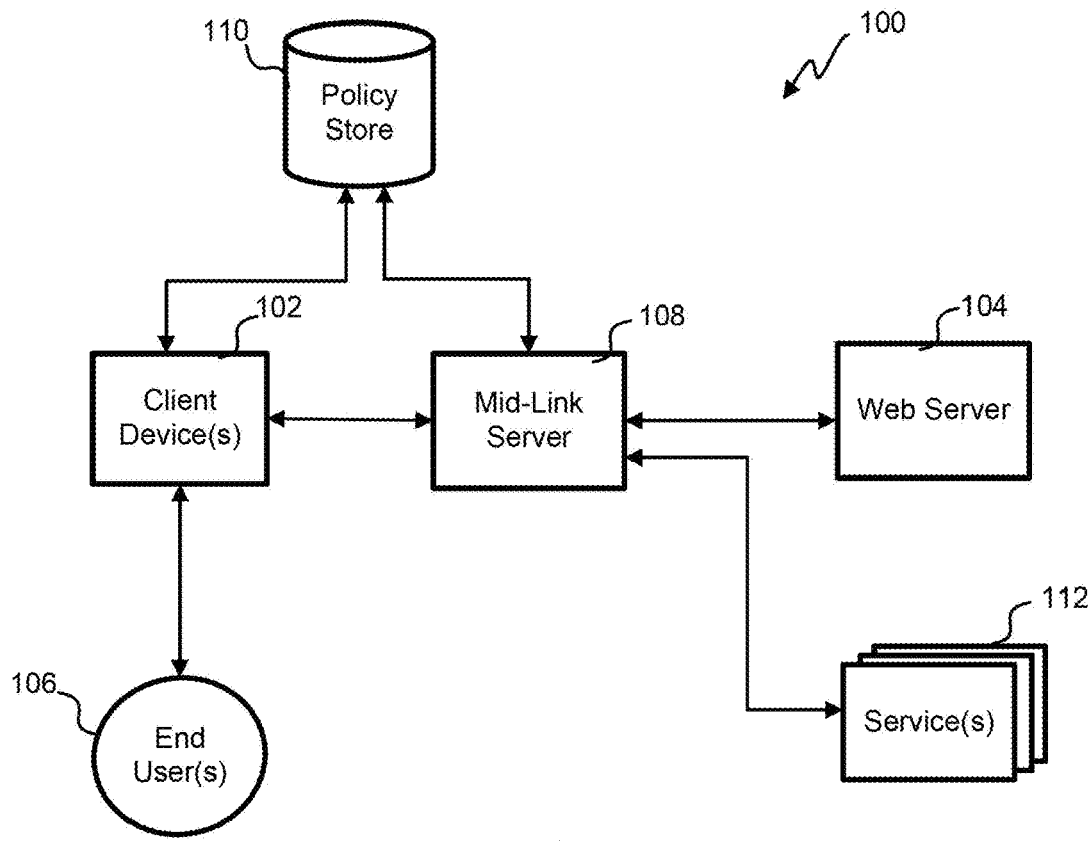
FIG. 1 illustrates a block diagram of an embodiment of a policy-based security system.

Referring first to FIG. 1, a block diagram of an embodiment of a policy-based security system 100 is shown. The policy-based security system 100 (or policy controlled communication system) includes client device(s) 102, a web server 104, end user(s) 106, a mid-link server 108, a policy store 110 (or a policy component), and services 112. The client device(s) 102 such as smartphones, tablets, PCs, and any other computers communicate with the web server 104 over encryption links using the internet. The encryption links deliver cloud services to the client device(s) 102. The client device(s) 102 can be secured by using the mid-link server 108 that remotely hosts the software environment that is secured. The client device(s) 102 run on any popular operating system (OS) such as Windows™, iOS™, Android™, Linux, set-top box OSes such as Real-Time Operating System (RTOS), Unix OS, Linux-Kernel, and Linux OS in the Internet of Things (IoT)/Industrial control systems (ICS)/Distributed Control Systems (DCS)/Operational Technology (OT), and Chromebook™. Third-party apps are applications running on the operating system of the client device(s) 102. The policy store 110 holds policies for each client device(s) 102 and the mid-link server 108.

The client device(s) 102 use content and processing from the web server 104 including content sites for example, web sites, streaming content, etc., and the services 112 for example, SaaS tools, databases, cloud service providers, etc. Under policy control, the client device(s) 102 routes some interaction to the mid-link server 108 that hosts a controlled software environment for each end user 106 to securely interact with the web server 104 and the services 112 or enterprise tools in a way limited by specified policies. For example, policies can specify configuration settings of encryption protocols and secure tunnels that are used for establishing a secure connection between the client device(s) 102 and the web server 104 while using the controlled software environment by remote access.

Policies control the manner in which the content is accessed, stored, processed, printed, stored, forwarded, emailed, or otherwise captured at the client device(s) 102. Other policies can enable certain software or interaction on the client device(s) 102 while physically on-premise and allowing different software or interaction while working in the field or at home away from the enterprise premises. In one example, policy on the client device(s) 102, cut-and-paste to/from the remote software environment can be disabled for some or all applications when accessed from the client device(s) 102 on a specific encryption link to the web server 104. In some cases, enforcement of the policy depends on whether the client device(s) 102 is within the enterprise or away from the office. The encryption link provides communication along with a network in an encrypted manner. The encryption link uses protocols for establishing secure links between the client device(s) 102 and the content sites of the web server 104. For example, Secure Sockets Layer (SSL) and its successor, Transport Layer Security (TLS), Hypertext Transfer Protocol (HTTP), Hypertext Transfer Protocol Secure (HTTPS), or any other encryption protocols are used for establishing authenticated and encrypted links between the client device(s) 102 and the web server 104. The policies can specify a direct link between the client device(s) 102 and the web server 104 if the client device(s) 102 meet encryption protocol standards like TLS or SSL. If the client device(s) 102 do not meet the encryption protocol standards but still need secure web access, then the policies protect the client device(s) 102 via a secure tunnel. One or more secure tunnels are configured between the client device(s) 102 and the mid-link server 108 to provide secure access to such client device(s) 102 that do not meet the encryption protocol standards. The secure tunnels between the client device(s) 102 and the mid-link server 108 are dedicated for secure connections and offer protection to the communication. An example of the policies is illustrated in Table 1 discussed below.

Table 1 below illustrates a list of policies, a list of parameters, and corresponding connection links stored in the policy store 110. The connection links are used for establishing connections using encryption protocols.

TABLE 1

| Policies | Parameters | Connections |
| --- | --- | --- |
| Policy 1 | User Connection | SSL3.0/TLS 1.1/TLS 1.2/HTTP 2.0 connection |
| Policy 2 | Destination Connection | TLS 1.2/HTTPS connection |
| Policy 3 | Source, Source Location | TLS 1.1, TLS 1.2 connection |
| Policy 4 | Destination, Destination Location | TLS 1.3 connection |
| Policy 5 | User Application | SSL 3.0/TLS 1.1/TLS1.2/TLS 1.3 connection/HTTPS |
| Policy 6 | Destination Application | TLS 1.3/TLS 1.3 PFS connection |
| Policy 7 | Data Classification: secret, confidential, encrypted | TLS 1.3 connection |
| Policy 8 | Data Type: text/html, video/mpeg, image/png, text/css, audio/basic | TLS 1.1/TLS 1.2 connection |
| Policy 9 | User groups, UEBA, metadata, user role | TLS 1.2/HTTP 1.0/1.1/ 1.2/2/0 connection |

TABLE 1-continued

| Policies | Parameters | Connections |
| --- | --- | --- |
| Policy 10 | Encryption Type: AES, DES, RSA | TLS 1.3 connection |
| Policy 11 | Performance Parameters: latency, bandwidth, throughput | TLS 1.2/TLS 1.3 connection |
| Policy 12 | User/Destination connection, Source/Destination/ Geolocations/User/ Source/Destination Application, UEBA, Data Type/Classification, Encryption Type, Performance Parameters | Secure Tunnels |

As illustrated in Table 1, the policies are specified with respective parameters and connections. For example, Policy 1 is associated with user connection at the client device(s) 102 which has respective SSL 3.0/TLS 1.1/TLS 1.2/HTTP 2.0 connections. That is based on the user connection, the policy requires a connection when the encryption protocols of the encryption links are one of SSL 3.0, TLS 1.1, TLS 1.2, or HTTP 2.0 connections else connection is established through the secure tunnel comprising HTTP or HTTPS connection. HTTP 2.0 connection is used when other connections like SSL 3.0/TLS 1.1/TLS 1.2 are not available. The secure tunnels are used when the client device(s) 102 do not meet the security standards of encryption protocols like TLS or SSL as described in policy 12. In another embodiment, when the connections are not met at the encryption links, an alert can be notified to an administrator or the end user 106 of the client device(s) 102 that the encryption link does not meet the policy 1 and therefore, a connection is unable to be established or the secure tunnel is used for the connection.

The web server 104 includes the content sites such as web sites, streaming content, etc. in order to provide content to the client device(s) 102. The web server 104 also allows the end user(s) 106 of the client device(s) 102 to upload and download content from the content sites. The web server 104 is in communication with the client device(s) 102 through the mid-link server 108 over the internet. In another embodiment, the policy-based security system 100 includes one or more application servers (not shown) for providing dynamic content to the client device(s) 102.

The mid-link server 108 for the work systems resides as a "man-in-the-middle" intentionally take over some or all: processing, application execution and/or content sites at the web server 104 and the services 112 interaction. The remote software environment is hosted by the mid-link server 108 for a policy-controlled experience using the policy store 110 for direction. Provisioning the policies between the client device and the web server is performed on the mid-link server 108. For example, the content sites at the web server 104 can have certain features disabled, filtered or modified by the mid-link server 108 so that the client device(s) 102 behaves as if it were to directly connect to the content sites of the web server 104. For example, a policy can specify connection using Transport Layer Security (TLS) 1.3 session links.

Some embodiments have policies that selectively direct traffic to the mid-link server 108 based on a label or tag of the content. A classifier can identify the label or the tag of the content. For example, the content can be classified as confidential, encrypted, restricted, public, or any other type associated with the content. For example, a secret document, encrypted file, or zipped folder is being transmitted by the client device(s) 102 to the content site of the web server 104. By way of another example, a file labeled as "secret" that is the secret document can be shared from the client device 102 on a TLS 1.3 perfect-forward-secrecy (PFS) encryption link. If the encryption link does not meet the policy requiring TLS 1.3 PFS encryption link, the document is not shared from the client device(s) 102 and the connection is established to the content site of the web server 104 via the secure tunnel including HTTP/HTTPS connection. In another embodiment, a policy can be established for allowed usage based on established security protocols. In yet another embodiment, based on a highly confidential document for sharing and the employee sharing the document being a junior level associate, even though the TLS 1.0 connection might be available as per the policy, the connection is established through the secure tunnel as it offers better security than the TLS 1.0. The policy may be modified based on the type of confidential document. In another embodiment, a president sharing the highly confidential document within office premises may be allowed to use the TLS 1.0 connection based on the policies.

The policy store 110 is a database that includes set of predefined policies for content sharing. The policy store 110 also includes parameters associated with the policies. The parameters include a user connection, content type, a destination application, data classification, a data type, a type of shared content, the confidentiality of the shared content, network data traffic, user role, user groups, tags, encryption type, application type, user's geographical location, protocol type, algorithm, threat, metadata, user and entity behavior analytics (UEBA) information, residency, and/or type of user connection, and/or performance. Performance parameters include latency, bandwidth, or throughput. The policies are defined based on the parameters. For example, a policy for an end user A in department XYZ of the enterprise restricts the communication from the client device(s) 102 on TLS 1.2 encryption links. Further, the end user A is barred from sending files labeled as "secret" and "confidential" to unauthenticated users outside of the enterprise network, the connection in this case can be established through the secure tunnels.

In an embodiment, the policy-based security system 100 allows multiple-tenants in different domains to communicate with the web server 104 over the internet such as cloud-based multi-tenant systems. The policy-based security system 100 allows multiple tenants or enterprises (not shown) to all use the same network separated by domain or some other logical separation. Encryption, leased/encrypted tunnels, firewalls, and/or gateways can be used to keep the data from one enterprise separate from other enterprises. Each client device(s) 102 can communicate with the web server 104 for services and storage using the internet. The mid-link server 108 provides multi-tenancy control, policies and routing for each domain.

Figure 2:
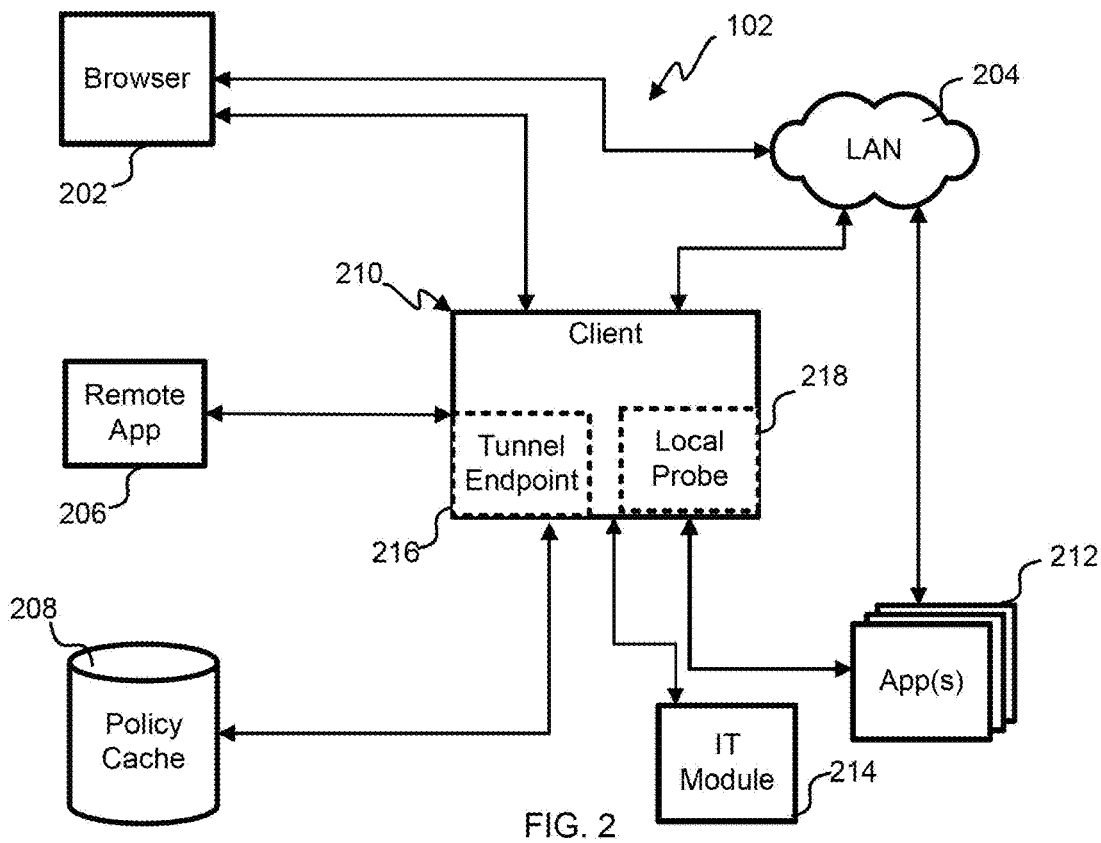
FIG. 2 illustrates a block diagram of an embodiment of a client device that uses a client to establish connections with a mid-link server.

Referring to FIG. 2, this embodiment of the client device 102 uses a client 210 to establish connections with the mid-link server 108. A remote app 206 uses the client 210 to communicate with the mid-link server 108 to maintain security for the operation of the remote app 206. An endpoint tunnel 216 (or a client endpoint) digitally segregates the traffic using protocols and/or encryption to avoid interception over the Local Area Network (LAN) 204 and Internet. Certain embodiments could use the SSL/TLS, HTTP, and/or HTTPS or a VPN to secure the endpoint tunnel 216. The client 210 communicates with the mid-link server 108 either via the secure tunnel configured from the endpoint tunnel 216 or a direct link. The direct link is used when the client device 102 meets security standards of the encryption protocols like TLS or SSL. The direct link establishes a session for the client device 102 with the web server 104 using the encryption protocols. The secure tunnel is used when the client device 102 do not meet the security standards of the encryption protocols. The secure tunnel establishes a session for the client device 102 with the web server 104 using a tunnel protocol like HTTP or HTTPS.

Display of the remote software environment is performed by the remote app 206. The whole interface of the remote software environment could be displayed or the interface of a single remote app could be displayed. Several instances of the remote app 206 could display several remote app interfaces respectively. Multiple instances of the remote app 206 could have several remote software environments respectively running. For example, a user of Chromebook™ can have one remote app 206 running iOS™ and another remote app 206 running Linux™ with the ability to switch back-and-forth in full-screen or windowed mode. The remote app 206 is a browser or a video player in some embodiments merely displaying a stream of video and gathering information with a local probe 218 to provide information for the remote software environment.

The local probe 218 in the client 210 gathers information of the client device 102, such as a user input (keyboard, mouse, touch screen, touchpad, gestures, haptic feedback, etc.), sensor information (trilateration location, compass, gyro, accelerometer, ambient light, video, camera, 3D movement detection, sound, sound arrays, temperature, etc.), and software environment (clock set time, time zone, installed or running apps 212, power status, battery status, app permissions, app settings, etc.). The local probe 218 gathers every information possible by the particular OS, computer hardware, OSI layer, or elsewhere to allow mimicry of those conditions at the software environment hosted on the mid-link server 108 for the client device 102. For example, the video camera on the client device 102 being a phone could be used by the software environment running iOS to participate in a video conference even when the user device 116 cannot natively support that video conference software.

The client 210 can apply policies that are stored locally in a policy cache 208 to the client device 102. The policy cache 208 is populated with policies from the policy store 110 that are relevant for the respective client device 102. As conditions change, the policies that are in effect could also change. For example, the camera/video sensors on the phone could be disabled inside the office or factory, but re-enabled outside of a geofenced area. Certain features, functions or applications might be disabled by the policy until certain conditions exist. For example, there may be a policy that: requires a recent anti-virus scan before establishing a connection to the LAN 204 on a TLS 1.2 encryption link, disables certain programs to be installed, and/or prevents emails to certain address(es), etc. from the client device 102.

This embodiment includes the endpoint tunnel 216 in the client 210. The endpoint tunnel 216 digitally separates packet traffic between the client device 102 and the mid-link server 108. There may be a number of endpoint tunnels 216 in operation simultaneously to support the remote app 206, any apps 212 or a browser 202 in communication with the mid-link server 108. A virtual private network (VPN) connection, HTTP, HTTPS connection, and/or public or private key encryption, or TLS encryption can be used for the endpoint tunnel 216 for different connections.

An Information Technology (IT) module 214 provides an interface for an administrator or IT staff for analyzing log reports and assigning policies to the client device(s) 102. The administrator of the enterprise reviews the policies, established connections, and the encryptions links. The administrator may also modify the policies by updating and/or upgrading the policies using the IT module 214.

Figure 3A:
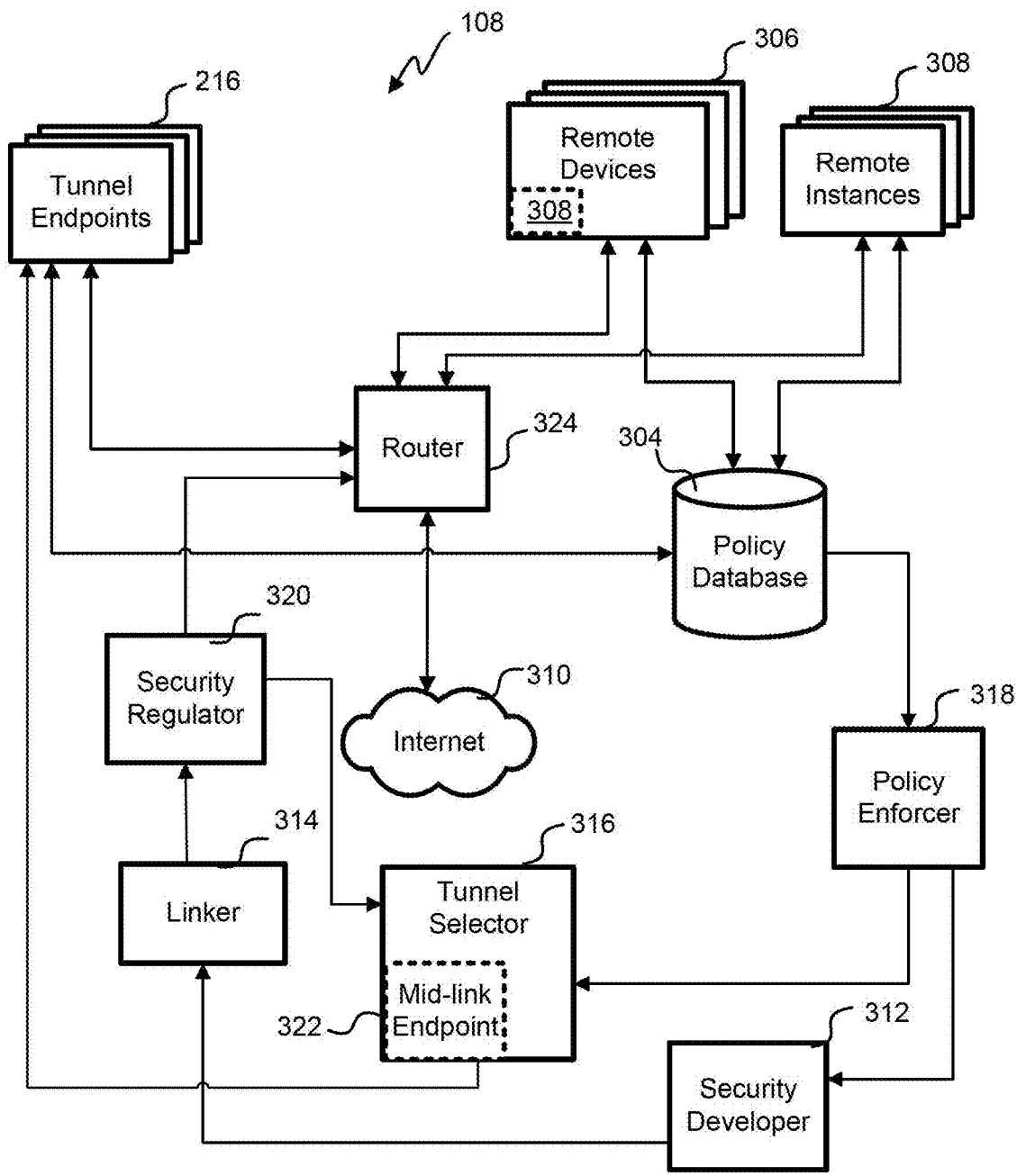
FIG. 3A illustrates a block diagram of an embodiment of a mid-link server that hosts software environments that client device(s) remote into.

Referring next to FIG. 3A, an embodiment of the mid-link server 108 is shown that hosts software environments that the client device(s) 102 remote into. Traffic is passed with an Internet 310 accessed through a router 324 to enable the various depicted components of the mid-link server 108 to communicate with each one another, specifically, endpoint tunnel 216, a policy database 304, remote devices 306, remote instances 308, a security developer 312, a linker 314, a tunnel selector 316, a policy enforcer 318, a security regulator 320, and a mid-link endpoint 322.

The mid-link server 108 hosts many different enterprises and domains keeping usage from their different client device(s) 102 separated. In other cases, the mid-link server 108 could be dedicated to a particular enterprise and hosted inside their network or the LAN 204 or with a third party hosting service. In any event, each remote instance 308 is dedicated to a client device 102 for use, although information technology (IT) staff have access to update software, apply policies, make configuration changes, modify admin settings and rights, etc. to maintain the remote instance 308. The endpoint tunnel 216 connects the client device(s) 102 with the mid-link endpoint 322 of the tunnel selector 316 over the Internet 310 in digitally segregated connections.

Both physical remote devices 306 and virtual-machine remote instances 308 are supported to run software environments. For example, the physical remote devices 306 may be tablets, smartphones, personal computers (Mac or PC), Chromebooks™, Linux™ servers, kiosks, or any personal computing device that employees might use. Any operating system running in a virtual machine on a physical device is supported to enable any enterprise to have their software environments running in a secure, controlled and potentially high performance instantiations. The remote instances 308 host content sites, websites or streaming content for the client device(s) 102.

The remote devices 306 are physical hardware that hosts a remote instance 308 and is dedicated to the client device 102 currently connected to the mid-link server 108. Not all operating systems enable running in a development mode or as a virtual machine to support all the functionality of the remote instance 308. For those situations, the operating system is running on a physical device temporarily dedicated to the client device 102 with software to enable the end user 106 to control the remote instance 308.

The policy database 304 includes a list of policies for setting up the connection between the client device 102 and the remote instances 308. The policy database 304 also includes a list of parameters based on which the connection with the remote instances 308 is established. The content to be shared and the connection to be established are matched within the list of parameters and their corresponding policies for establishing the connection. By way of an example, encrypted content to be uploaded to a content site requires TLS 1.2 connection to be established at the remote instance 308. Here, in this example, a parameter is data type—encrypted document, and the corresponding policy associated with the data type—encrypted is TLS 1.2 connection. In other embodiments, encryption keys, encryption protocols, quality of service, authentication requirements, performance parameters for the client device(s) 102, and/or other requirements for the client device(s) 102 are included in the list of parameters. By way of another example, the endpoint tunnel 216 cannot connect with the client device(s) 102 that have a modified HTTP stack that wouldn't have the same level of trust as one built into the operating system. A connection other than TLS 1.3 will result in a connection through HTTP/HTTPS that is via the secure tunnel from the endpoint tunnel 216 and the mid-link endpoint 322. The policy database 304 is distributed from the policy store 110 and updated for each client device 102, their enterprise, their country, current location of the client device 102, etc.

The policy enforcer 318 identifies the policies for the client device 102 requesting to connect with the web server 104. The policies are identified based on a set of parameters corresponding to the client device 102 such as a type of requested service, application type, remote instance type, the content involved or user information, device profiling, among others. A set of policies are identified and provided to the security developer 312 and the tunnel selector 316 for further processing.

The security developer 312 retrieves the policies corresponding to the parameters of the content for the client device 102 and identifies the connection or an encryption link to be established. For example, if the content to be shared is of an encrypted type, a policy that requires only TLS 1.3 connection be established. The security developer 312 identifies the policies from the policy enforcer 318 and provides them to the linker 314 for establishing the connection via the encryption link. The encryption link is used for connecting with the web server 104.

The linker 314 inspects the connection corresponding to the policy received from the security developer 312 for selecting one or more encryption protocols corresponding to the connection or the encryption link. The encryption protocols being TLS, SSL, TLS PFS. The linker 314 identifies the encryption protocols for the connection through the router 324 to the remote instances 308 for the client device 102. For example, the linker 314 identifies TLS 1.3 protocol for the policy requiring connection to only TLS 1.3 connection. The linker 314 inspects the connections and identifies the TLS 1.3 protocol using which the connection is to be established. The linker 314 initiates the TLS 1.3 connection using the router 324 to the corresponding remote instance 308. The linker 314 provides the identified encryption protocols to the security regulator 320.

The security regulator 320 determines whether the client device 102 satisfies the security standards of the encryption protocols. For example, whether the client device 102 satisfies the requirements for a TLS 1.0/1.2/1.3 connection. The policies for the client device 102 enable the client device 102 to satisfy the requirements of the encryption protocols based on the type of service requested, the user application, the user role in the enterprise, the confidentiality of the content being shared, or the UEBA information associated with the client device 102. If the client device 102 satisfies the security standards of the encryption protocols, then the connection is established via the direct link with the web server 104 using an encryption protocol selected from the encryption protocols and the corresponding encryption link. However, if the client device 102 does not satisfy the security standards of the encryption protocols, then the connection is established via the security tunnel from the tunnel selector 316.

The tunnel selector 316 establishes the connection for the client device 102 with the web server 104 via the mid-link server 108 using the secure tunnels. A secure tunnel from a number of secure tunnels between the client device 102 and the mid-link server 108 is selected by the tunnel selector 316. A tunnel protocol such as HTTP or HTTPS corresponding to the secure tunnel is selected by the tunnel selector 316 to establish the secure session with the web server 104. The mid-link endpoint 322 establishes the connection of the secure tunnel and the router 324 further establishes the connection to the web server 104 using the encryption link and the tunnel protocol.

Figure 3B:
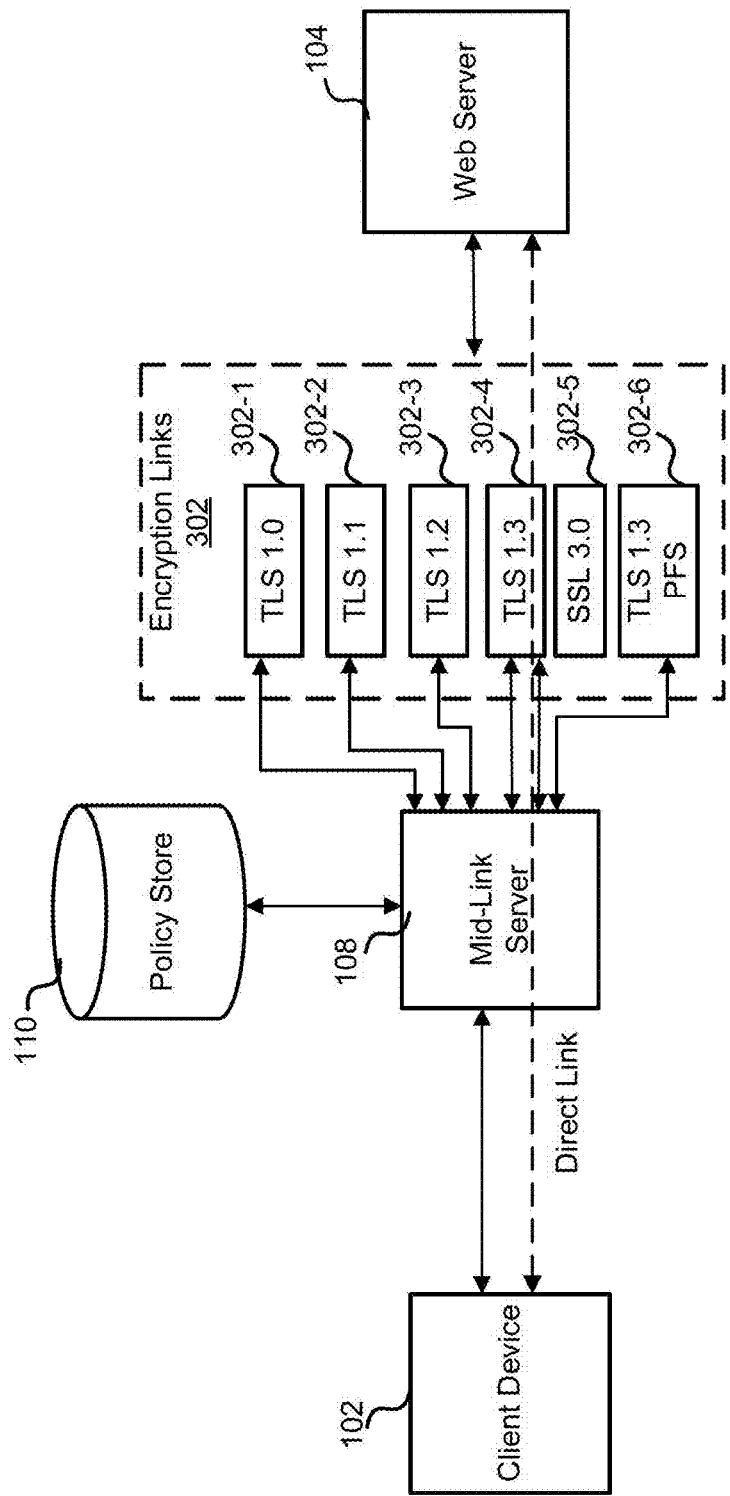
FIG. 3B illustrates a block diagram of an embodiment of a mid-link server where a direct link including encryption links are used for a secure connection between a client device and a web server in accordance with a set of policies.

Referring next to FIG. 3B, an embodiment of the mid-link server 108 is shown where a direct link including encryption links 302 are used for a secure connection between the client device 102 and the web server 104 in accordance with a set of policies. Policies exist at different stages of connection between the client device 102 and the web server 104. The mid-link server 108 facilitates the connection between the client device 102 and the web server 104. The policies enforced at the client device 102 are referred to as a first mile, the policies inspected at the mid-link server 108 are referred to as a middle mile, and the policies enforced at the web server 104 are referred to as the last mile.

An administrator or IT staff of an enterprise has control over the policies at the first mile that is at the client device 102. The administrator enforces the policies at the client device 102 based on a user group, business unit, user profile, user device, remote working, and/or geolocation. The policies are associated with the connections that are used to be established to communicate with the web server 104. For example, a policy requires a TLS 1.3 connection to communicate.

The mid-link server 108 performs a check at the web server 104 of the connections corresponding to the policies. The mid-link server 108 performs inspection at the middle mile using the policies from the list of policies stored in the policy store 110. The mid-link server 108 controls web traffic for establishing the connection between the client device 102 and the web server 104. If the mid-link server 108 determines that the connections to the web server 104 conform with the policies, the connection is established via the direct link. The determination can be based on machine learning algorithms. However, if the mid-link server 108 determines that the connection is in accordance with the policies, then a secure connection is established by the mid-link server 108 via the direct link using the encryption protocols.

At the web server 104, the last mile policies are checked to establish the connection. For example, the web server 104 checks for the policies provided by the mid-link server 108 and responds to the mid-link server 108. If the connections are in accordance with the policies for example, TLS 1.3 connection, the connection is established with the client device 102 through the mid-link server 108. The connections between the middle mile and the last mile are encryption links 302. The various encryption links available with the web server 104 can be TLS 1.0 link 302-1, TLS 1.1 link 302-2, TLS 1.2 link 302-3, and TLS 1.3 link 302-4. Among these encryption links 302, one of the encryption links 302 that is in accordance with the policies are used to connect with the client device 102.

Figure 3C:
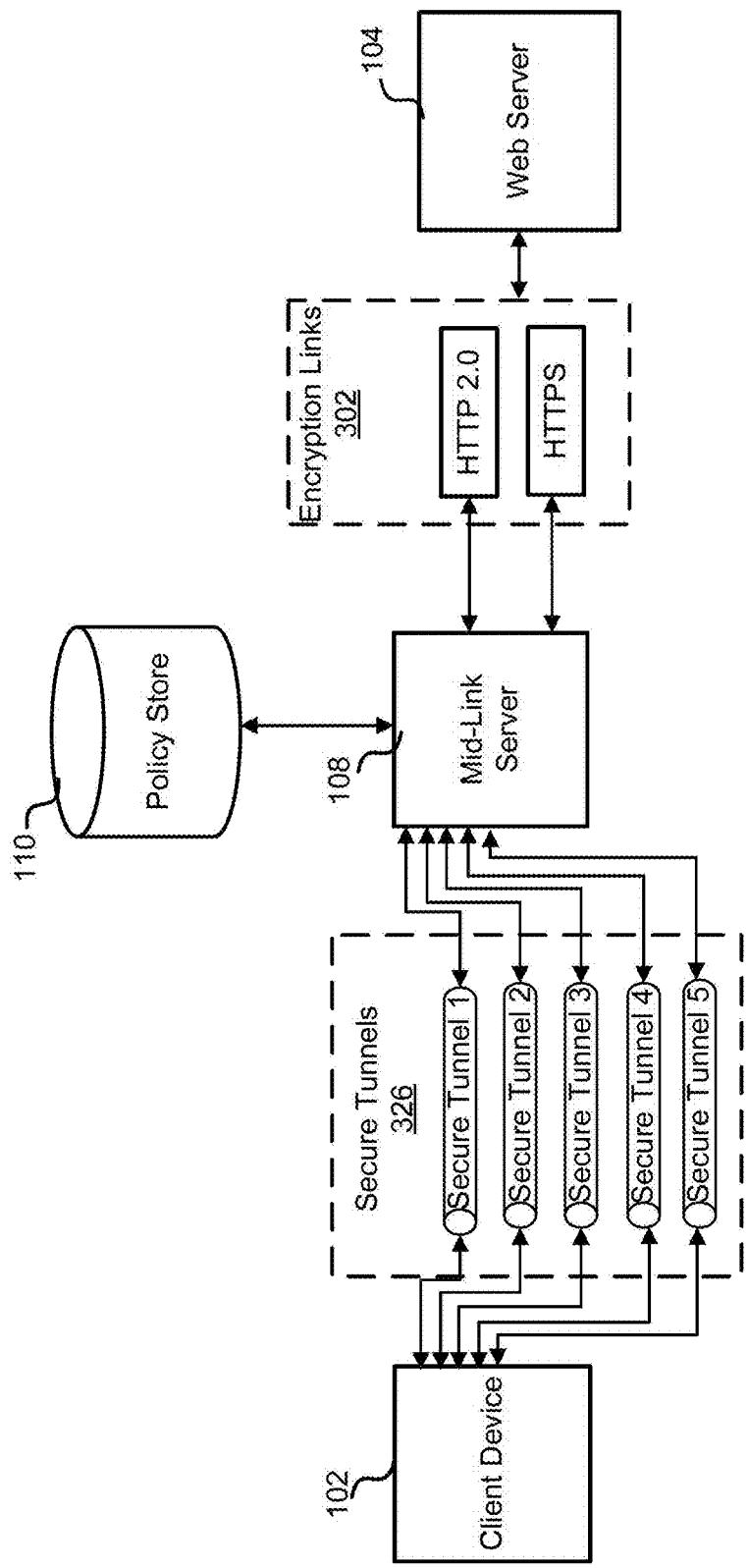
FIG. 3C illustrates a block diagram of an embodiment of a mid-link server where secure tunnels are used for providing a secure connection between a client device and a web server in accordance with a set of policies.

Referring next to FIG. 3C, an embodiment of the mid-link server 108 is shown where secure tunnels 326 are used for providing a secure connection between the client device 102 and the web server 104 in accordance with a set of policies.

The secure tunnels 326 are used when the client device 102 does not meet the requirements of the security standards that is the encryption protocols. The policies specify the secure tunnels 326 for the encryption links 302 of the client devices 102 connecting to the web server 104 that do not meet common security standards such as TLS or SSL but still need secure web access. The secure tunnel would connect the client device 102 to the mid-link server 108 and would be configurable. For example, HTTP over HTTPS tunneling provides a secure tunnel for communication.

The secure tunnels 326 offer high security to the client device 102. The secure tunnels 326 may be used for connections when highly confidential contents are shared or suspicious activities from the client device 102 (based on UEBA analysis) are identified. The policies associated with the connection may be modified if the secure tunnels 326 are used over the direct link and the tunnel protocol is used instead of the encryption protocols.

Figure 4:
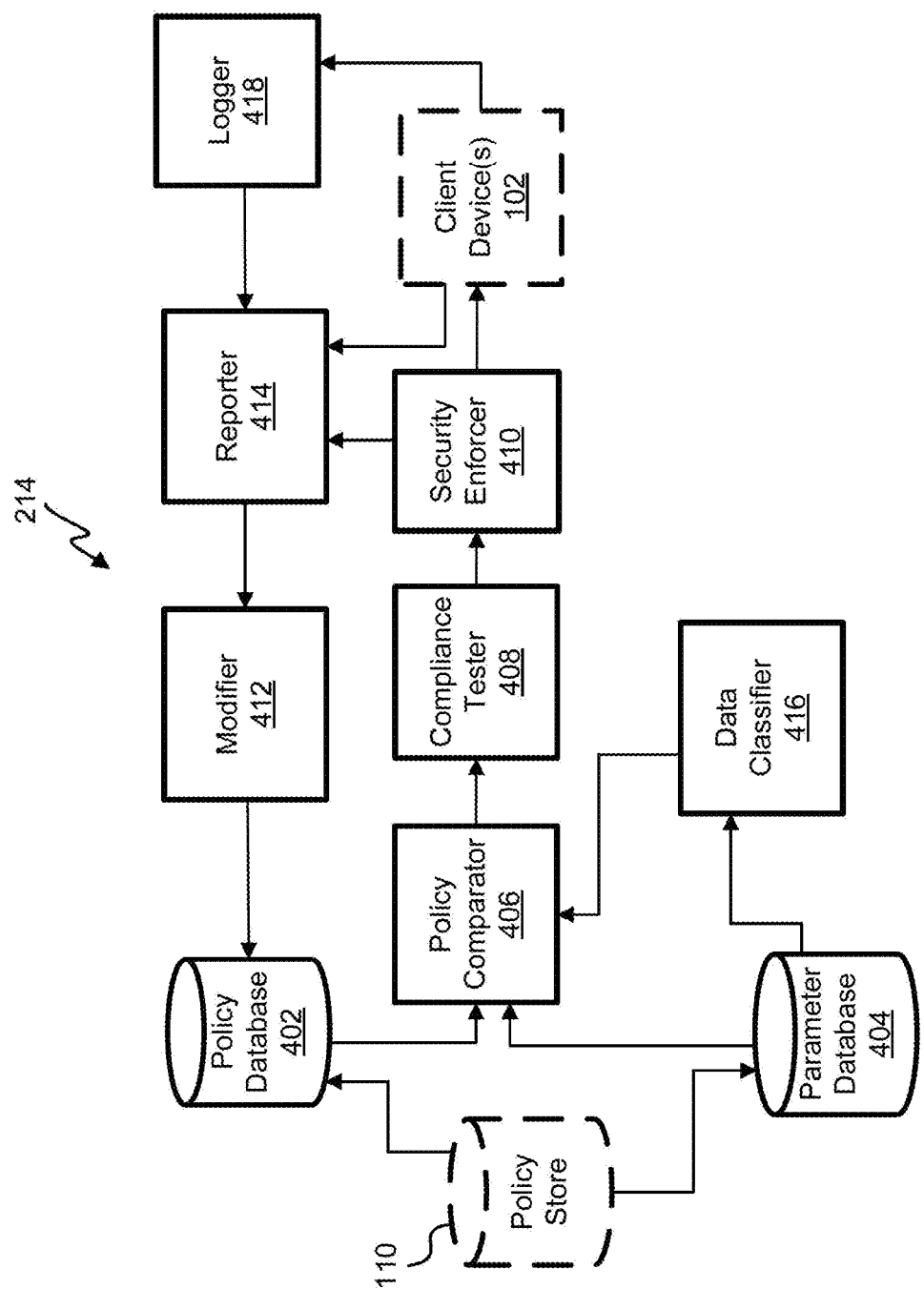
FIG. 4 illustrates a block diagram of an embodiment of an Information Technology (IT) module configured to enforce policies on a client device and review log reports of established connections between the client device and a web server.

Referring to FIG. 4, an embodiment of an Information Technology (IT) module 214 configured to enforce policies on the client device 102 and review log reports of established connections between the client device 102 and the web server 104. The IT module 214 includes a policy database 402, a parameter database 404, a policy comparator 406, a compliance tester 408, a security enforcer 410, a modifier 412, a reporter 414, a data classifier 416, and a logger 418.

The policy database 402 and the parameter database 404 have stored policies and parameters from the policy store 110, respectively. To initiate a connection requests from the client device(s) 102 to the web server 104, the policy comparator 406 matches the policies from the policy database 402 with the parameters from the parameter database 404 based on the client device(s) 102, a type of connection, a service type, and a type of content of the request. The policy database 402 includes a list of policies with the corresponding parameters and connection types. The parameter database 404 includes parameters corresponding to the client device(s) 102, the type of connection, the service type, and the type of content of the request.

The policy database 402 and the parameter database 404 also include respective threshold values. Based on the request from the client device 102, the parameters are determined from the parameter database 404. The determined parameters are compared with the parameters in the policy database 402 for determining the policies corresponding to the parameters. The policies and the corresponding connections are determined from the match of the parameters with the policies in the policy database 402. The threshold values of the policies and the parameters are also compared. For example, a policy threshold value of SSL or TLS 1.0 connection or TLS connections higher than the TLS 1.0. A parameter threshold value of the type of content—secure or confidential and type of encryption such as AES. Meeting the policy and the parameter threshold values provides options for connection.

Further, the policy comparator 406 extracts tags of content to be shared from the client device(s) 102 to content sites or websites of the web server 104. For example, Data Loss Prevention (DLP) techniques can be used to read the tags. The tags are extracted by the data classifier 416. The data classifier 416 identifies a tag having a header and metadata of the content and provides it to the policy comparator 406. For example, the content can be classified by tagging as confidential, encrypted, restricted, public or any other type of tag can be associated with the content.

The policy comparator 406 uses the tag as one of the parameters for comparison with the parameters in the policy database 402. The policy and connections are determined based on the parameters matched with the policies in the policy database 402. The determined policies are provided to the compliance tester 408 for verification.

The compliance tester 408 verifies the received policies in accordance with government regulations of the geographical location. The policies are checked for any kind of violation of the government rules and regulations. In case the policies are in violation of the government regulations or are in compliance with the government regulations, an indication is sent to the security enforcer 410 for further actions.

The security enforcer 410 enforces the policies on the client device 102 based on the indication received from the compliance tester 408 when the policies comply with the government regulations. In case the policies violate the government regulations, an alert is displayed to the administrator on the reporter 414 and the client device 102 so that the administrator and/or the end user 106 may take action regarding the issue.

The logger 418 is a repository of log reports of past and current connections of the client device(s) 102, alerts of non-connected client devices, client reports on the client device(s) 102 for compliance with the policies, and analytics on the usage of the cloud services by the client device(s) 102. The logger also stores historical log reports of policies implemented on the client device(s) 102. The logger continuously monitors the connections of the client device 102 and gathers log data from the client device(s) 102. The log reports are provided to the reporter 414 for further analysis.

The reporter 414 is a display device coupled with a processor and a memory to facilitate the administrator to analyze the log reports of the past and current connections of the client device(s) 102 obtained from the logger 418. Security of the connections, violations of the standards and performance parameters are analyzed by the administrator using the display device. The reporter 414 also indicates alerts regarding violations of the policies from the government regulations so that the administrator may perform certain actions with respect to the violations. The analyzed data is provided to the modifier 412 for further processing.

The modifier 412 processes the analyzed data from the reporter 414 to modify the policies if required. For example, client device(s) 102 may be enforced with updated policies and connections. TLS connections or any other kind of connections are updated and/or upgraded from time to time. Accordingly, the policies also update and further the list of policies in the policy database 402 is updated. Further, parameters also change, user profiles and client device(s) 102 may also update, accordingly the parameters and their policies are updated. Based on a history of established connections, client device(s) 102, content types and the destinations at the web server 104, the policies may be modified and implemented. The policies are modified for the secure session based on an update and/or an upgrade of the encryption protocols or the secure tunnel that is being used. The administrator provides approval to the modified policies after which the policies are stored in the policy database 402 for implementation.

Figure 5:
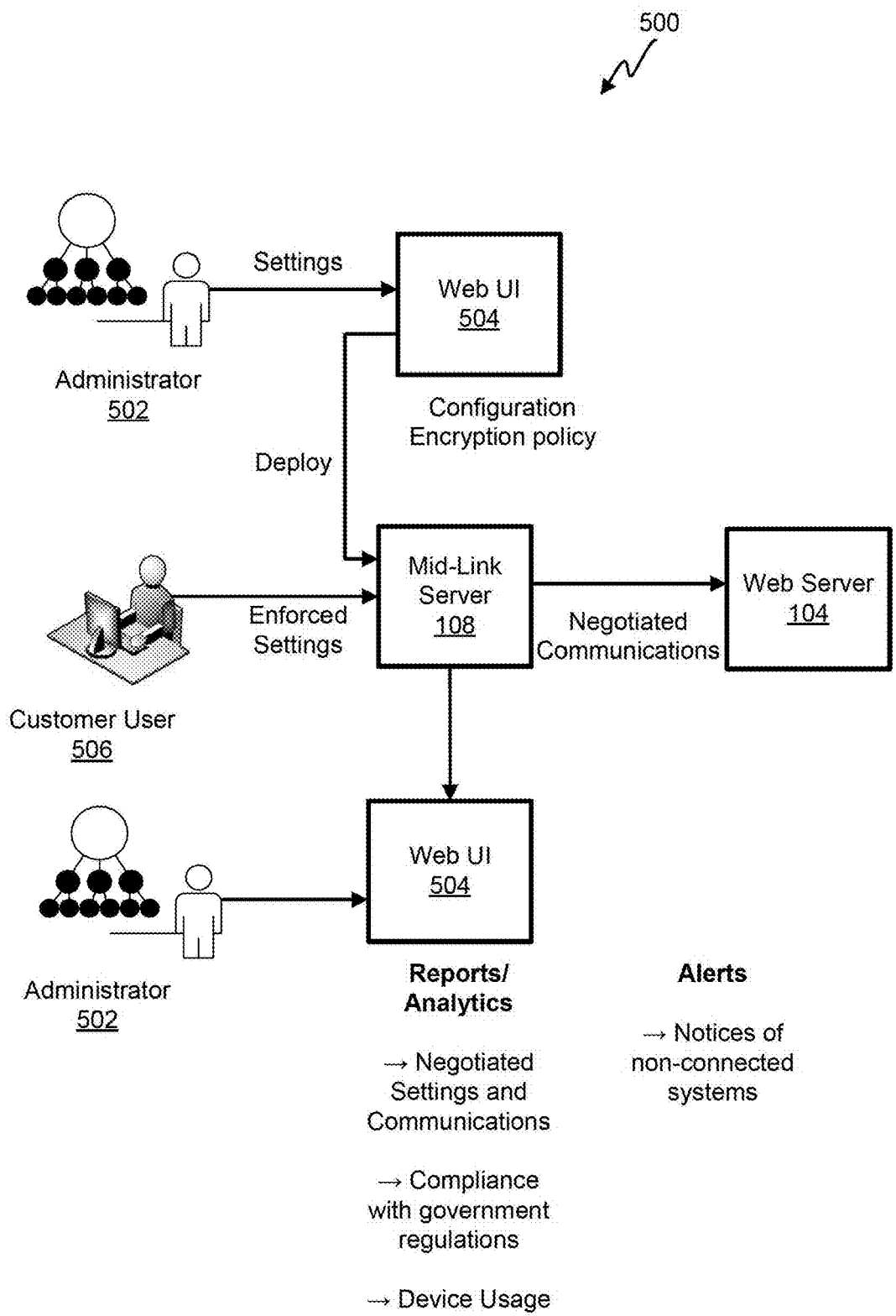
FIG. 5 illustrates a flow diagram of an embodiment of a policy-based security system where policies are deployed at a client device by an administrator of an enterprise.

Referring to FIG. 5, a flow diagram 500 of an embodiment of the policy-based security system 100 is shown where policies are deployed at the client device 102 by an administrator 502 of an enterprise.

An administrator 502 uses a display device with a web user interface (UI) 504 to enforce configuration settings for policies at the client device 102. A customer user 506 of the client device 102 is able to share content with the web server 104 based on the enforced policies. The policies are further deployed by the administrator 502 on the mid-link server 108. The mid-link server 108 becomes aware of the policies and establishes communication with the web server 104 based on the policies.

The mid-link server 108 negotiates with the web server 104 according to the policies and establishes a connection when the web server 104 complies with the policies. For example, a policy requires TLS 1.3 PFS connection, in this case the mid-link server 108 establishes a connection with the TLS 1.3 PFS connection via the direct link else the connection is established via the secure tunnel, and an alert may be generated to the administrator 502 for performing an action.

The administrator 502 analyzes log reports of the connections and policies. The administrator also receives alerts from the mid-link server 108 regarding non-compliance with the policies. In such situations, the administrator may modify the policies such that the connection is established or may instruct the mid-link server 108 to establish the connection via the secure tunnel or HTTP/HTTPS connections. A threshold value for each of the policies may also be predetermined and defined by the administrator 502 or may be predefined by a third party which may help establish secure connections. For example, in case a TLS 1.3 connection is available and the content to be shared is not confidential, the administrator 502 may modify the policies with TLS 1.3 PFS to also include TLS 1.3 connection. The threshold value being the parameter—type of content—not confidential. According to the modified policies and the parameters meeting the predetermined threshold value, the mid-link server 108 may establish the connection. In another example, a policy may be modified when the secure tunnel is used for connection instead of the direct link using HTTP/HTTPS protocols.

The negotiated configuration settings, device usage, alerts including notices on non-connected client device(s) 102, the established connections, and the communications are analyzed by the administrator 502 through the log reports. Analysis of links and checking compliance with government regulations are other functions performed by the administrator 502 using the log reports of the connections.

Figure 6:
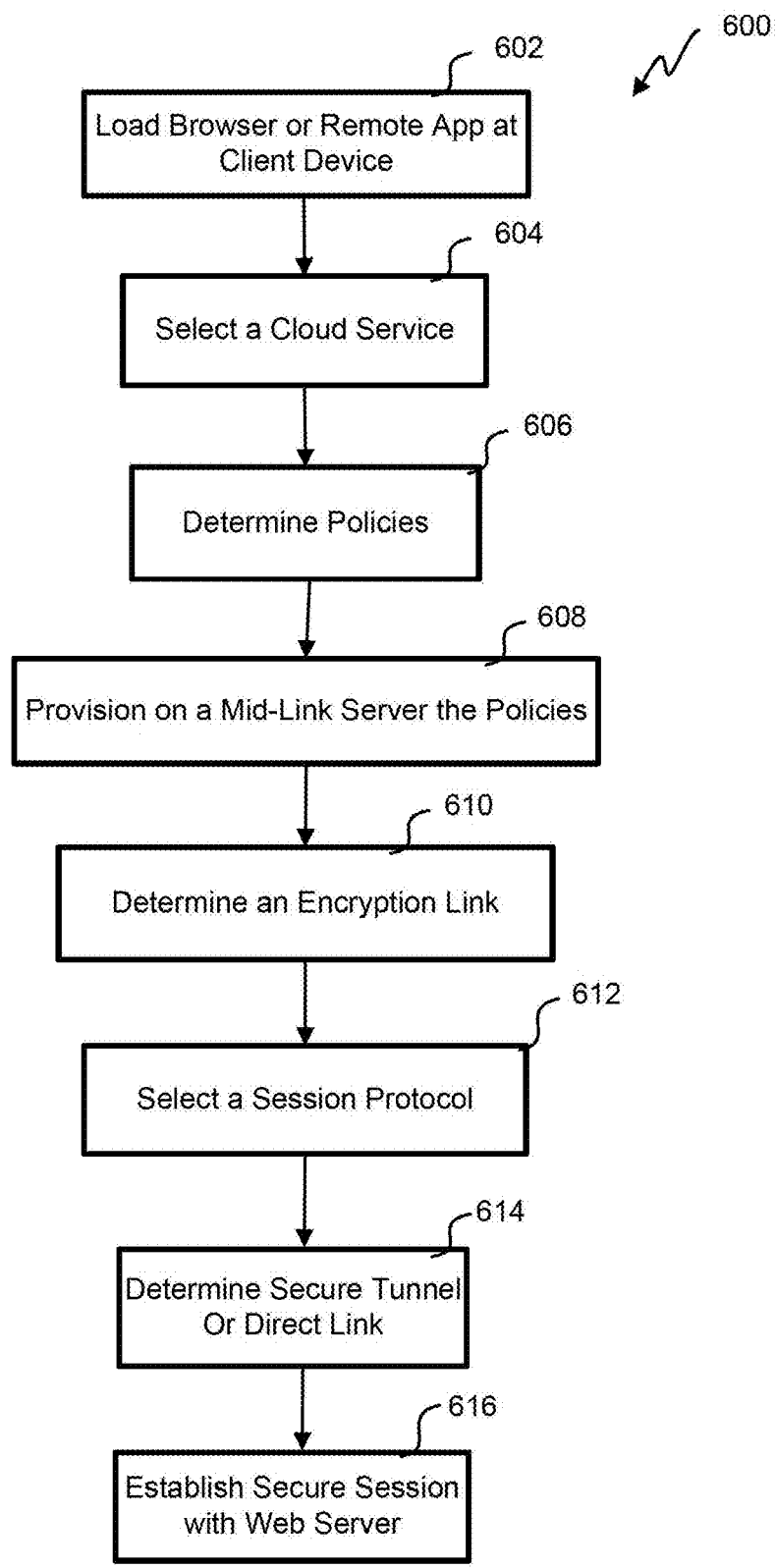
FIG. 6 illustrates a flowchart of an embodiment of a policy controlled connection process for a client device.

Referring next to FIG. 6, a flowchart of an embodiment of a policy controlled connection process 600 for a client device 102 is shown. The depicted portion of the process begins at block 602 where a user of the client device 102 loads browser or a remote application at the client device 102. The user desires to access a content site or upload a document to another site of the web server 104 at a first mile. The user initiates the request for connection to the web server 104 to the mid-link server 108. The mid-link server 108 acts as an intermediate server controlling the connection at a middle mile based on a set of policies. The web server 104 provides connection at a last mile.

An administrator of an enterprise of the user of the client device 102 enforces the set of policies at the client device 102. The policies are enforced based on a set of parameters including a user connection, a destination application, data classification, data type, content type, user groups, tags, application type, encryption type, user's geographical location, user and entity behavior analytics (UEBA) information, user residency, and/or type of user connection, and/or performance. The administrator confirms compliance with the policies with government regulations.

At block 604, the user of the client device 102 selects a cloud service for access using the remote application, the cloud service is accessed from the web server 104. The cloud service can be downloading or browsing content from a website, streaming content from the website or uploading or sharing content to the website or remote instances of the web server 104.

At block 606, the request for accessing the cloud service is made to the mid-link server 108 by the client device 102. The mid-link server 108 determines the policies for the client device 102, checks the policies enforced at the client device 102, and compares them with the policies determined and the policies enforced at the web server 104.

At block 608, if the web server 104 is able to provide a connection in accordance with the policies, then the mid-link server 108 initiates the connection using an encryption link determined based on the policies else the connection is not initiated. An alert is provided to the administrator in this case for further action.

At block 610, session protocols are determined in accordance with the encryption link and the policies. For example, TLS 1.3 connection protocol, TLS 1.2 connection protocol etc. Machine learning algorithms may be set to select the most secure connection protocol in accordance with the encryption link and the policies. For example, TLS 1.3 connection may be insecure if there exists an upgraded TLS connection. In such situations, the machine learning algorithms determine the most secure session protocol. If the TLS 1.3 or TLS 1.2 connection is not available, the machine learning algorithms determine HTTP or HTTPS session protocol for connection.

At block 614, a secure tunnel or a direct link to establish the connection is determined based on whether the client device 102 meets the security standards of the session protocols. If the client device 102 meets the security standards of the session protocols, then the direct link with the web server 104 is used for connection using the session protocols and the encryption link. If the client device 102 meets the security standards of the session protocols, then the secure tunnel and the corresponding tunnel protocol such as HTTP or HTTPS are used for the connection using the encryption links.

At block 616, a secure connection or a secure session is established with the web server 104 in accordance with the policies and based on the secure tunnel or the direct link used. Based on the established connection, the client device 102 communicates with the web server 104. The secure session can also be established based on modified policies when the alert is generated. The alert indicates that the policies at the web server 104 do not meet the policy requirements of the client device 102 and also do not satisfy a policy threshold value and/or a parameter threshold value associated with the policies. The administrator can modify the policies at the client device 102 as a remedial action to the alert. The administrator can also indicate not to establish the session based on non-compliance with the policies or establish connections using the secure tunnel.

Figure 7:
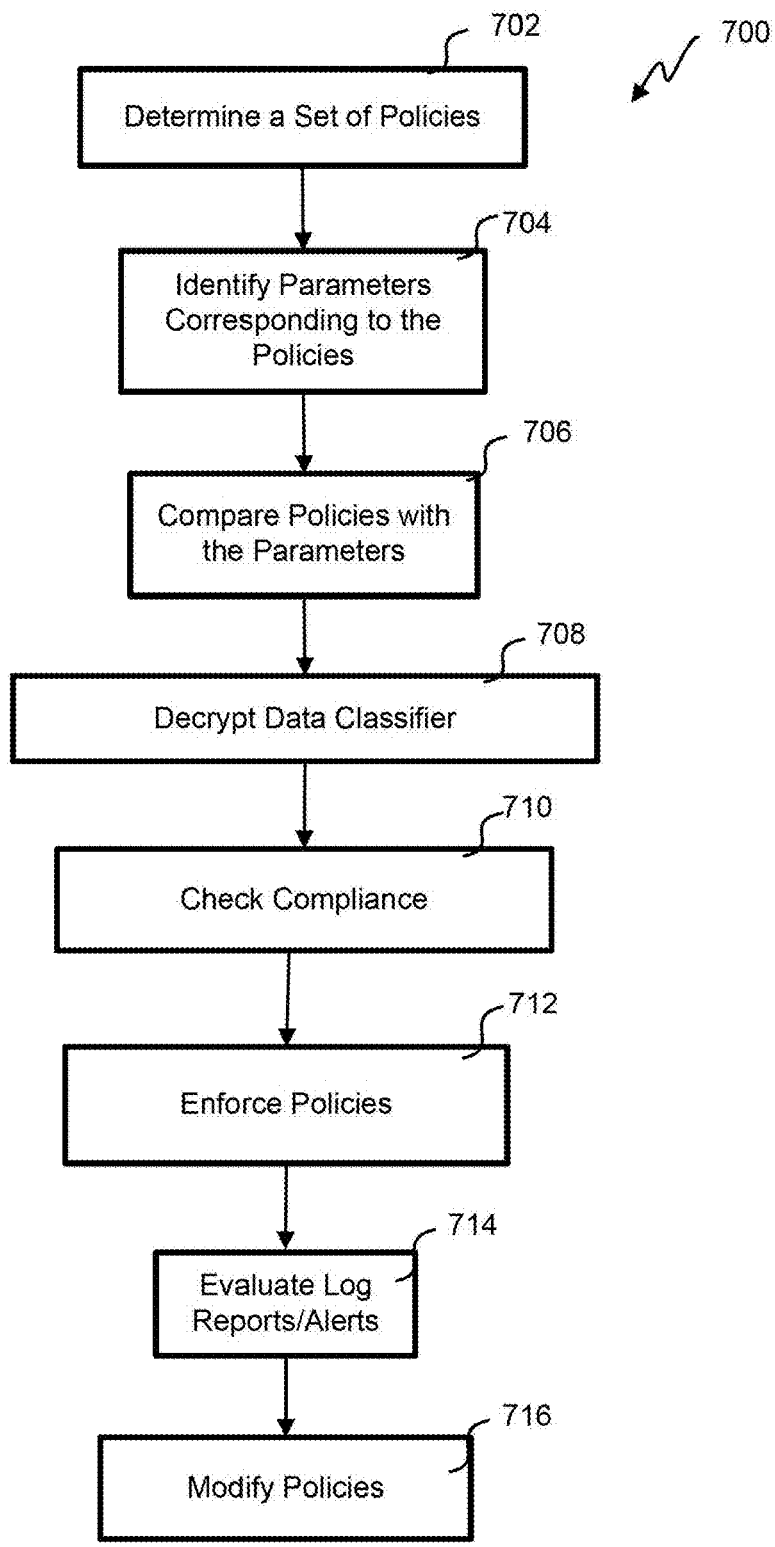
FIG. 7 illustrates a flowchart of an embodiment of a policy enforcement process for a client device.

Referring next to FIG. 7, a flowchart of an embodiment of a policy enforcement process 700 for a client device 102 is shown. The depicted portion of the process 700 begins at block 702 where an administrator of an enterprise determines a set of policies for each of the client device(s) 102 of the enterprise. One or more of the client device(s) 102 may desire to share content with content sites of the web server 104. The policies are determined based on a set of parameters.

At block 704, the set of parameters for respective client device(s) 102 are identified from a policy store 110. The set of parameters may also be identified using metadata from integrations of the client device(s) 102. The set of parameters are stored in the policy store 110. The respective set of parameters are the user connection, the destination connection, a user application, the destination application, a source, a source location, a destination, a destination location, application type, type of connection, geographical location, residency, the data classification, data type, user groups, encryption type, and/or performance.

At block 706, the policies are compared with the set of parameters using a list of policies stored in the policy store 110. The list of policies includes policies against the set of parameters. The list of policies also includes connections for each of the policies. Based on the comparison in the list of policies, the connections for each of the policies is determined.

At block 708, a tag associated with the content to be shared is declassified. The tag includes a header and metadata. The tag is read to declassify the information of the tag. For example, the tag can be confidential, secure, non-confidential, encrypted, high importance, or restricted. Based on the tag, the policies are further filtered.

At block 710, compliance of the policies with government rules and regulations is verified. The set of policies are in accordance with the government regulations. The administrator verifies the compliance with the government regulations.

At block 712, the policies are enforced on the respective client device 102 by the administrator. The policies are based on the set of parameters and the tag associated with the content. Communication with the web server 104 is based on the enforced policies.

At block 714, the administrator reviews log reports, device usage of the client device(s) 102, alerts on non-connected client device(s) 102 (if any), and the established connections of the client device(s) 102. The administrator analyzes the policies and determines whether the policies require modification. In case of non-compliance with the government policies or the policies not being met at the web server 104 as determined by the mid-link server 108, the administrator may modify the set of policies depending on the case. The policies may be modified to establish a connection via the secure tunnel including the HTTP/HTTPS connection when the policies are not met.

At block 716, the set of policies are modified based on the determination that the policies require updating. The policies are modified by updating or upgrading the set of policies based on the analysis. The modified policies are enforced on the respective client device 102.

Figure 8:
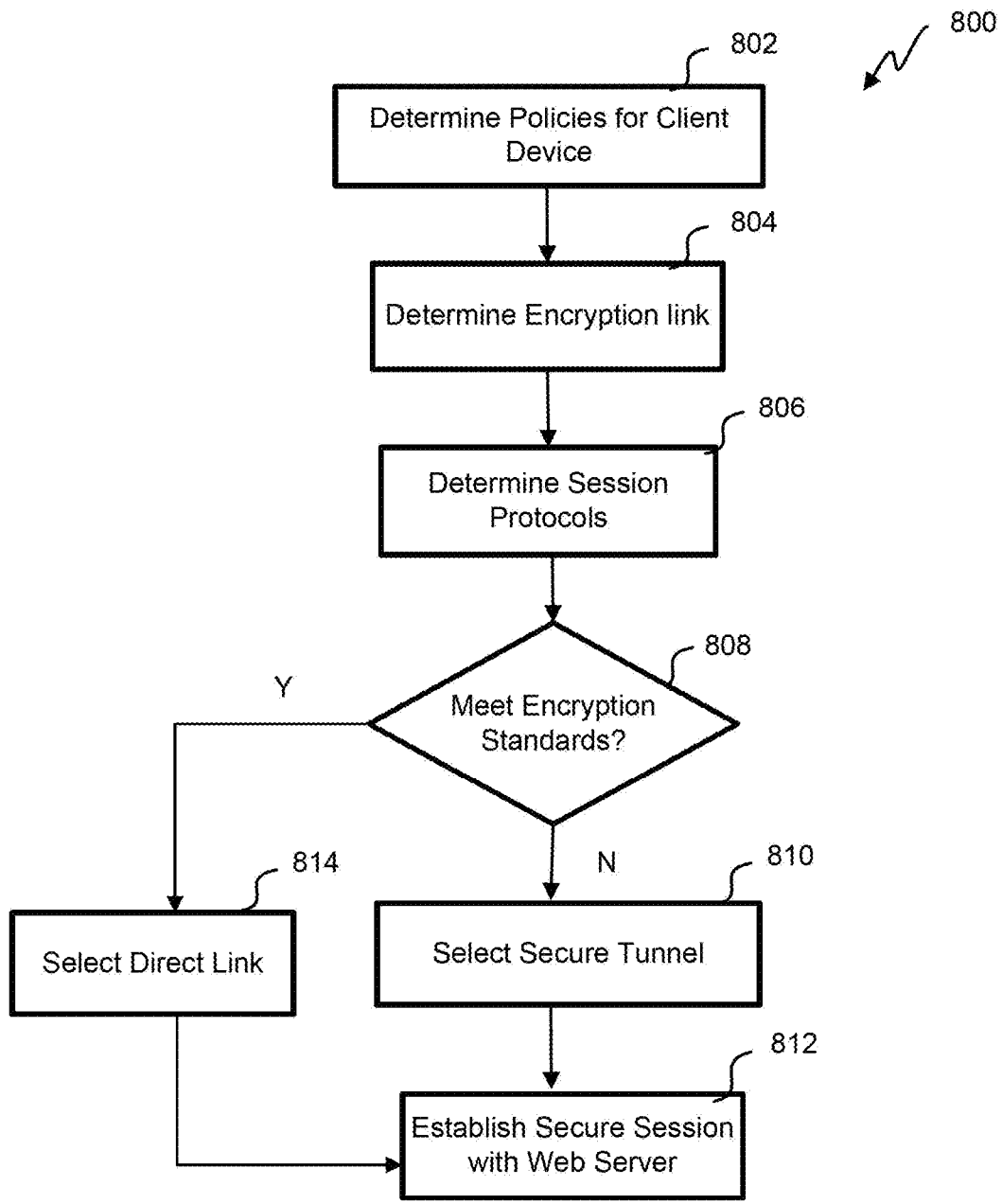
FIG. 8 illustrates a flowchart of an embodiment of a link selection process for a client device.

Referring next to FIG. 8, a flowchart of an embodiment of a link selection process 800 for a client device 102 is shown. The depicted portion of process 800 begins at block 802 where policies are determined for the requesting client device 102. The client device 102 requests to access a cloud service from a web server 104 using a local application of the client device 102. The policies for the client device 102 are determined based on the parameters. The parameters include a user connection, a user application, a user location, a type of source, a source location, a destination, a destination location, a destination connection, a destination application, an application type, a type of shared content, confidentiality of the shared content, network data traffic, metadata, user role, user team, user and entity behavior analytics (UEBA) information, and/or user residency.

At block 804, based on the policies, an encryption link is determined to establish the connection with the web server 104. The encryption link facilitates the connection of the client device 102 with the web server 104.

At block 806, a number of session protocols are determined based on the policies. The session protocols include encryption protocols such as TLS, SSL, HTTP, HTTPS or other types of encryption connection protocols.

At block 808, it is determined whether the client device 102 meets the encryption standards of the session protocols, that is, whether the client device 102 can establish a connection using one of the session protocols or not. If the client device 102 meets the encryption standards of the session protocols, a direct link is selected at block 814. A secure session is established with the web server 104 via the direct link at block 812.

If the client device 102 does not meet the encryption standards of the session protocols, then a secure tunnel is selected at block 810. The secure session is established with the web server 104 via the secure tunnel using a tunnel protocol including HTTP/HTTPS at block 812.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

I claim:

1. A policy-based security system for establishing a direct link or a secure tunnel from client devices to remote instances on a web server, the policy-based security system comprising:
   a policy component comprising a plurality of policies, wherein:
      the plurality of policies is based on a set of parameters, and
      the plurality of policies specifies configuration settings of a plurality of secure tunnels and a plurality of session protocols,
   a client device with a local application configured to execute on the client device, the local application is further configured to select a cloud service from a plurality of cloud services for shared content,
   a data classifier identifies a tag associated with the shared content, wherein the shared content is to be provided between a client device and the web server,
   a mid-link server, coupled to the plurality of specified secure tunnels, the mid-link server comprising:
      a policy enforcer configured to determine a set of policies from the plurality of policies for the client device based on the set of parameters and the identified tag, wherein the set of determined policies selectively direct traffic to the mid-link server based on the identified tag of the shared content, and wherein (a) if the client device satisfies security standards the set of determined policies specify a direct link between the client device and the web server and (b) if the client device does not satisfy the security standards, the set of determined policies specify to establish a secure session of a secure tunnel from the plurality of specified secure tunnels between the client device and the mid-link server; and
      a router configured to establish via an encryption link a secure session of the client device with the web server for providing the shared content using:
         a session protocol from the set of session protocols based on the direct link; or
         a tunnel protocol based on the secure tunnel.

2. The policy-based security system for establishing a direct link or a secure tunnel from client devices to remote instances on a web server as recited in claim 1, wherein the secure tunnel from the plurality of secure tunnels and the session protocol from the plurality of session protocols to establish the secure session between the client device and the web server in accordance with the set of policies is based on a remote instance and/or an application for access to the cloud service.

3. The policy-based security system for establishing a direct link or a secure tunnel from client devices to remote instances on a web server as recited in claim 1, wherein the secure session between the client device and the web server is established based on the parameters of the set of policies meeting a predetermined threshold value.

4. The policy-based security system for establishing a direct link or a secure tunnel from client devices to remote instances on a web server as recited in claim 1, wherein the set of parameters include at least one of a user connection, a user application, a user location, a type of source, a source location, a destination, a destination location, a destination connection, a destination application, an application type, a type of shared content, confidentiality of the shared content, network data traffic, metadata, user role, user team, user and entity behavior analytics (UEBA) information, and/or user residency.

5. The policy-based security system for establishing a direct link or a secure tunnel from client devices to remote instances on a web server as recited in claim 1, wherein the tag is metadata associated with a type of the shared content, and the shared content is classified based on the metadata.

6. The policy-based security system for establishing a direct link or a secure tunnel from client devices to remote instances on a web server as recited in claim 1, wherein the set of policies are determined by an administrator of an enterprise associated with the client device based on a user group, the enterprise, or a user role, and the policy enforcer is further configured to determine the set of policies based on device profiling of the client device.

7. The policy-based security system for establishing a direct link or a secure tunnel from client devices to remote instances on a web server as recited in claim 1, wherein the set of policies are modified when the secure tunnel is used for connection instead of the direct link using Hypertext Transfer Protocol (HTTP), Hypertext Transfer Protocol Secure (HTTPS) protocols.

8. The policy-based security system for establishing a direct link or a secure tunnel from client devices to remote instances on a web server as recited in claim 1, wherein an administrator of an enterprise associated with the client device receives and analyzes:
log reports of the secure session of the client device with the web server, and
alerts of non-connected client devices,
wherein:
the log reports include client reports on a plurality of client devices for compliance with the plurality of policies, and analytics on usage of the plurality of cloud services on the plurality of client devices, and
the set of policies are modified for the secure session based on an update and/or an upgrade of the session protocol or the secure tunnel.

9. A method for establishing policy-based security for a secure session between a plurality of client devices and a web server in cloud-based multi-tenant systems, the method comprising:
identifying a tag associated with a shared content, wherein the shared content is to be provided between a client device and the web server;
provisioning on a mid-link server, coupled to a plurality of secure tunnels, between the client device and the web server, the set of policies;
determining a set of policies for a client device of the plurality of client devices with a policy component having a plurality of policies, wherein:
the set of policies from the plurality of policies are determined based on a set of parameters and the identified tag,
the set of policies specify configuration settings of a plurality of secure tunnels and a plurality of session protocols, and
the set of determined policies selectively direct traffic to the mid-link server based on the identified tag of the shared content, and wherein (a) if the client device satisfies security standards the set of determined policies specify a direct link between the client device and the web server and (b) if the client device does not satisfy the security standards, the set of determined policies specify to establish a secure session of a secure tunnel from the plurality of specified secure tunnels between the client device and the mid-link server;
receiving from a local application running on the client device of the plurality of client devices, selection of a cloud service from a plurality of cloud services for providing the shared content;
provisioning on a mid-link server between the client device and the web server, the set of policies;
determining an encryption link of a plurality of encryption links specified for the set of policies and the cloud service, wherein the plurality of encryption links deliver the cloud service to the client device;
selecting a set of session protocols from the plurality of session protocols for establishing a secure session between the client device and the web server in accordance with the set of policies; and
establishing via the encryption link a secure session of the client device with the web server for providing the shared content using:
a session protocol from the set of session protocols based on the selection of the direct link, or
a tunnel protocol based on the selection of the secure tunnel.

10. The method for establishing policy-based security for a secure session between a plurality of client devices and a web server in cloud-based multi-tenant systems as recited in claim 9, wherein the secure tunnel from the plurality of secure tunnels and the session protocol from the plurality of session protocols to establish the secure session between the client device and the web server in accordance with the set of policies is based on a remote instance and/or an application for access to the cloud service.

11. The method for establishing policy-based security for a secure session between a plurality of client devices and a web server in cloud-based multi-tenant systems as recited in claim 9, wherein the secure session between the client device and the web server is established based on the parameters of the set of policies meeting a predetermined threshold value.

12. The method for establishing policy-based security for a secure session between a plurality of client devices and a web server in cloud-based multi-tenant systems as recited in claim 9, wherein the set of parameters include at least one of a user connection, a user application, a user location, a type of source, a source location, a destination, a destination location, a destination connection, a destination application, an application type, a type of shared content, confidentiality of the shared content, network data traffic, metadata, user role, user team, user and entity behavior analytics (UEBA) information, and/or user residency.

13. The method for establishing policy-based security for a secure session between a plurality of client devices and a web server in cloud-based multi-tenant systems as recited in claim 9, wherein shared content between the client device and the web server is labeled with tags, the tags are metadata associated with a type of the shared content, the shared content is classified based on the metadata, and the set of policies are determined based on the tags.

14. The method for establishing policy-based security for a secure session between a plurality of client devices and a web server in cloud-based multi-tenant systems as recited in claim 9, wherein the set of policies are determined by an administrator of an enterprise associated with the client device based on a user group, the enterprise, or a user role.

15. The method for establishing policy-based security for a secure session between a plurality of client devices and a web server in cloud-based multi-tenant systems as recited in claim 9, further comprising a policy enforcer configured to determine the set of policies based on device profiling of the client device.

16. A policy-controlled communication system including client devices establishing a secure session with remote instances on a web server using an encryption protocol, the policy-controlled communication system comprising a plurality of servers, collectively having code for:
    identifying a tag associated with a shared content, wherein the shared content is to be provided between a client device and the web server;
    provisioning on a mid-link server, coupled to a plurality of secure tunnels, between the client device and the web server, the set of policies;
    determining a set of policies for a client device of a plurality of client devices with a policy component having a plurality of policies, wherein:
        the set of policies from the plurality of policies are determined based on a set of parameters and the identified tag,
        the set of policies specify configuration settings of a plurality of secure tunnels and a plurality of session protocols, and
        the set of determined policies selectively direct traffic to the mid-link server based on the identified tag of the shared content, and wherein (a) if the client device satisfies security standards the set of determined policies specify a direct link between the client device and the web server and (b) if the client device does not satisfy the security standards, the set of determined policies specify to establish a secure session of a secure tunnel from the plurality of specified secure tunnels between the client device and the mid-link server;
    receiving from a local application running on the client device of the plurality of client devices, selection of a cloud service from a plurality of cloud services for providing the shared content;
    determining an encryption link of a plurality of encryption links specified for the set of policies and the cloud service, wherein the plurality of encryption links deliver the cloud service to the client device;
    selecting a set of session protocols from the plurality of session protocols for establishing the secure session between the client device and the web server in accordance with the set of policies; and
    establishing via the encryption link a secure session of the client device with the web server for providing the shared content using:
        a session protocol from the set of session protocols based on the direct link, or
        a tunnel protocol based on the secure tunnel.

17. The policy-controlled communication system with the client devices establishing the secure session with the remote instances on the web server using the encryption protocol as recited in claim 16, wherein the secure tunnel from the plurality of secure tunnels and the session protocol from the plurality of session protocols to establish the secure session between the client device and the web server in accordance with the set of policies is based on a remote instance and/or an application for access to the cloud service.

18. The policy-controlled communication system with the client devices establishing the secure session with the remote instances on the web server using the encryption protocol as recited in claim 16, wherein the secure session between the client device and the web server is established based on the parameters of the set of policies meeting a predetermined threshold value.

19. The policy-controlled communication system with the client devices establishing the secure session with the remote instances on the web server using the encryption protocol as recited in claim 16, wherein the set of parameters include at least one of a user connection, a user application, a user location, a type of source, a source location, a destination, a destination location, a destination connection, a destination application, an application type, a type of shared content, confidentiality of the shared content, network data traffic, metadata, user role, user team, user and entity behavior analytics (UEBA) information, and/or user residency.

20. The policy-controlled communication system with the client devices establishing the secure session with the remote instances on the web server using the encryption protocol as recited in claim 16, wherein shared content between the client device and the web server is labeled with tags, the tags are metadata associated with a type of the shared content, the shared content is classified based on the metadata, and the set of policies are determined based on the tags.

* * * * *